(12) United States Patent
Nemeth et al.

(10) Patent No.: US 12,316,475 B2
(45) Date of Patent: May 27, 2025

(54) APPARATUS AND A METHOD FOR PROVIDING A REDUNDANT COMMUNICATION WITHIN A VEHICLE ARCHITECTURE AND A CORRESPONDING CONTROL ARCHITECTURE

(71) Applicant: KNORR-BREMSE Systeme fuer Nutzfahrzeuge GmbH, Munich (DE)

(72) Inventors: Huba Nemeth, Budapest (HU); Csaba Kokrehel, Budapest (HU); Adam Bardos, Martonvasar (HU); Gabor Toereki, Erd (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 17/596,756

(22) PCT Filed: Jun. 15, 2020

(86) PCT No.: PCT/EP2020/066462
§ 371 (c)(1),
(2) Date: Dec. 17, 2021

(87) PCT Pub. No.: WO2020/260050
PCT Pub. Date: Dec. 30, 2020

(65) Prior Publication Data
US 2022/0239526 A1  Jul. 28, 2022

(30) Foreign Application Priority Data
Jun. 25, 2019 (EP) .................................. 19182279

(51) Int. Cl.
*H04L 12/40* (2006.01)
(52) U.S. Cl.
CPC .. *H04L 12/40182* (2013.01); *H04L 12/40195* (2013.01); *H04L 2012/40273* (2013.01)

(58) Field of Classification Search
CPC ......... H04L 12/40182; H04L 12/40195; H04L 2012/40273; H04L 12/40176; H04L 12/40202; G05B 9/03
See application file for complete search history.

(56) References Cited

U.S. PATENT DOCUMENTS

| | | | |
|---|---|---|---|
| 9,195,232 B1 | 11/2015 | Egnor et al. | |
| 2003/0011487 A1* | 1/2003 | Bracklo | B60R 25/04 340/12.22 |

(Continued)

FOREIGN PATENT DOCUMENTS

| | | |
|---|---|---|
| CN | 101399673 A | 4/2009 |
| CN | 103246213 A | 8/2013 |

(Continued)

OTHER PUBLICATIONS

International Search Report (PCT/ISA/210) issued in PCT Application No. PCT/EP2020/066462 dated Sep. 1, 2020 (three (3) pages).

(Continued)

*Primary Examiner* — Hoang-Chuong Q Vu
(74) *Attorney, Agent, or Firm* — Crowell & Moring LLP

(57) ABSTRACT

An apparatus for providing a redundant communication within a vehicle architecture is disclosed. The vehicle architecture includes a plurality of commanded units, each being configured to be controlled by redundant communication lines. The apparatus includes at least a first control unit and a second control unit, which are connected by an interlink communication line and which are each configured to: communicate with the commanded units through one of the redundant communications lines; and communicate with each other through the communication lines by controlling (Continued)

at least one of the plurality of commanded units to act as a gateway unit and to forward information between the redundant communication lines.

15 Claims, 2 Drawing Sheets

(56) References Cited

U.S. PATENT DOCUMENTS

| | | | |
|---|---|---|---|
| 2006/0126256 A1* | 6/2006 | Forest | B60W 50/045 |
| | | | 361/139 |
| 2006/0253726 A1* | 11/2006 | Kukshya | G06F 11/202 |
| | | | 714/E11.078 |
| 2007/0047436 A1 | 3/2007 | Arai et al. | |
| 2008/0296106 A1* | 12/2008 | Nilsson | B60T 8/345 |
| | | | 701/115 |
| 2011/0116508 A1* | 5/2011 | Kirrmann | H04L 12/437 |
| | | | 370/392 |
| 2013/0274900 A1 | 10/2013 | Uhde et al. | |
| 2016/0009257 A1 | 1/2016 | Joyce et al. | |
| 2016/0234037 A1 | 8/2016 | Mabuchi | |
| 2016/0366336 A1* | 12/2016 | Kuehnle | G06V 20/56 |
| 2018/0097721 A1 | 4/2018 | Matsui et al. | |
| 2018/0131700 A1 | 5/2018 | Ando et al. | |
| 2018/0212822 A1* | 7/2018 | Ikeda | H04L 41/082 |
| 2018/0212977 A1* | 7/2018 | Gangi | H04L 63/123 |
| 2018/0290642 A1* | 10/2018 | Tschiene | B60T 8/885 |
| 2018/0351915 A1* | 12/2018 | Nakano | H04L 63/0227 |
| 2019/0007264 A1* | 1/2019 | Nakamura | H04L 41/0816 |
| 2019/0095371 A1* | 3/2019 | Yoshino | H04L 12/40019 |
| 2019/0302742 A1* | 10/2019 | Grosch | H04L 12/40202 |
| 2019/0386702 A1* | 12/2019 | Mizutani | B60R 16/0231 |
| 2020/0052773 A1* | 2/2020 | Go | H04L 67/12 |
| 2021/0061194 A1* | 3/2021 | Sugawa | B60R 16/023 |
| 2021/0243049 A1* | 8/2021 | Kuwata | H04W 4/24 |
| 2025/0039212 A1* | 1/2025 | Maeda | H04W 4/48 |

FOREIGN PATENT DOCUMENTS

| | | |
|---|---|---|
| CN | 107187465 A | 9/2017 |
| CN | 107896238 A | 4/2018 |
| CN | 109005477 A | 12/2018 |
| CN | 109917779 A | 6/2019 |
| EP | 3 179 674 A1 | 6/2017 |
| EP | 3 331 201 A1 | 6/2018 |
| JP | 2007-60184 A | 3/2007 |
| JP | 2018-160710 A | 10/2018 |
| WO | WO 2020/057934 A1 | 3/2020 |

OTHER PUBLICATIONS

Written Opinion (PCT/ISA/237) issued in PCT Application No. PCT/EP2020/066462 dated Sep. 1, 2020 (seven (7) pages).

Extended European Search Report issued in European Application No. 19182279.0 dated Nov. 15, 2019 (five (5) pages).

Japanese-language Office Action issued in Japanese Application No. 2021-577019 dated Mar. 5, 2023 with English translation (eight (8) pages).

Chinese-language Office Action issued in Chinese Application No. 202080044923.0 dated Mar. 31, 2023 with English translation (13 pages).

Chinese-language Office Action issued in Chinese Application No. 202080044923.0 dated Oct. 11, 2023 with English translation (10 pages).

Korean-language Office Action issued in Korean Application No. 10-2021-7041567 dated Apr. 9, 2024 with English translation. (10 pages).

Chinese-language Office Action issued in Chinese Application No. 202080044923.0 dated Jan. 17, 2024 with partial English translation (7 pages).

* cited by examiner

APPARATUS AND A METHOD FOR
PROVIDING A REDUNDANT
COMMUNICATION WITHIN A VEHICLE
ARCHITECTURE AND A CORRESPONDING
CONTROL ARCHITECTURE

BACKGROUND AND SUMMARY OF THE
INVENTION

The present invention relates to an apparatus and a method for providing a redundant communication within a vehicle architecture. In particular, the present invention relates to a control architecture for a vehicle, and a control method for a control architecture of a vehicle.

A motor vehicle contains several subsystems that can jointly realize vehicle operations such as the propulsion and transmission system, steering system, braking system, where each subsystem is controlled by their associated control unit. A malfunction of a subsystem, in the actuator or at an individual control system level, may prevent the further operation of the vehicle or can cause at least a degradation of its functionalities. For automated driving the safety relevant systems like braking and steering require redundant setup and an appropriate communication between them.

U.S. Pat. No. 9,195,232 describes systems for compensating for common failures in fail operational systems. The system may include a primary controller configured to perform functions of a vehicle such as propulsion braking and steering and a secondary controller configured in a redundant configuration with the primary controller. The system includes a control module configured to transfer control of the vehicle between the controllers based on detecting a fault. The control module may detect a common fault of the controllers that causes the control module to output a common fault signal. In response the system may transfer of control to a safety controller configured to perform the vehicle functions until the system may transfer control back to the primary controller.

US 2016/009257 describes a system with an autonomous subsystem that includes first and second braking modules. Each of the modules includes a processor and a memory the memory storing instructions executable by the processor for detecting a fault. The system further includes a brake sub-system programmed to actuate a brake mechanism in response to a signal from the second braking module.

The autonomous sub-system is further programmed to select one of the braking modules to provide a signal to the brake mechanism depending on whether a fault is detected.

However, these systems have only limited redundancy and there is a need to provide an improved system redundancy.

The present invention relates to an apparatus for providing a redundant communication within a vehicle architecture. The vehicle architecture includes a plurality of commanded units, each being configured to be controlled by redundant communication lines. The apparatus comprises at least a first control unit and a second control unit, which are connected by an interlink communication line and which are each configured:
  to communicate with the commanded units through one of the redundant communications lines; and
  to communicate with each other through the communication lines by controlling at least one of the plurality of commanded units to act as a gateway unit and to forward information between the redundant communication lines.

Therefore, the interlink communication line and the communication through the communication lines and the gateway unit form a redundant interlink communication between the at least first and second control units. It is understood that the term "lines" may refer to a wired connection. However, the invention shall not be restricted to wired connections, but should likewise include wireless connections between various (vehicle) components. It is further understood that the architecture may include further control units being able to communicate with the commanded units or with other commanded units. Likewise, the number or function of the commanded units is not restricted. The control units may be used for braking, steering, transmission and/or an energy management or for other applications in the vehicle. The commanded units may include intelligent energy cells, wheel end control units, actuators for braking or steering or transmission, modulators, valves etc.

Optionally, the gateway unit is configured to forward information in each direction between the communication lines. In addition, each or any of the commanded units may be configured to act as a/different gateway(s) to forward data between the redundant communication lines.

Optionally, the at least first and second control units are configured to act either as a master or as a slave. The concrete role can be predetermined or selected freely. For example, the at least first and second control units can be configured to select one of them as a master and the other as a slave following a predetermined algorithm by exchanging information through the interlink communication line or through the communication lines. For example, in a first mode of operation the first control unit is configured to act as a master controller and the second control unit is configured to act as a slave controller. In a second mode of operation the second control unit is configured to act as a master controller and the first control unit is configured to act as a slave controller. In other words, the control units can take either a master or slave role, where one of them has the master role, while one or more other control units have a slave role.

The vehicle architecture may include redundant vehicle communication networks, so that the interlink communication line and the (redundant) communication through the gateway unit(s) are configured to transmit data received from one of the redundant vehicle communication networks, via the first and second control units to the other of the redundant vehicle communication networks (or vice versa).

In this manner, a critical situation where one of the communication fails is mitigated.

Optionally, the interlink communication line and/or the communication through the gateway is/are configured to swap data between the at least first and second control units to enable a plausibility check and/or a cross-check.

Embodiments relates also to a vehicle architecture with an apparatus as defined before.

Optionally, the vehicle architecture includes the redundant vehicle communication network (e.g. two independent networks) which are configured to provide data or control signals to either a first control unit or to a second control unit.

Further embodiments relate to a method for providing a redundant communication within a vehicle architecture, wherein the vehicle architecture again includes: a plurality of commanded units, each being configured to be controlled by a first and a second communication line, at least a first and a second control unit, and an interlink communication line between the at least first and second control units. The method includes:

communicating of the first control unit with the commanded units through the first communication line;

communicating of the second control unit with the commanded units through the second communication line; and controlling at least one of the plurality of commanded units to act as a gateway unit to forward data between the first and second communication lines.

Optionally, the method may include establishing a redundant communication between the first and second control units by transmitting data between the first and second control units through the interlink communication line; or transmitting data between the first and second control units through the gateway unit.

This method may also be implemented in software or as a computer program product. The order of steps may not be important to achieve the desired effect. Embodiments of the present invention can, in particular, be realized in or as an electronic control unit (ECU) or implemented by software or a software module in an ECU. Therefore, embodiments relate also to a computer program having a program code for performing the method, when the computer program is executed on a processor.

Embodiments provide thus a control system architecture with redundancy, thereby improving safety and system performance.

Some examples of the systems and/or methods will be described in the following by way of examples only, and with respect to the accompanying figures.

DETAILED DESCRIPTION OF THE DRAWINGS

Figure 1:
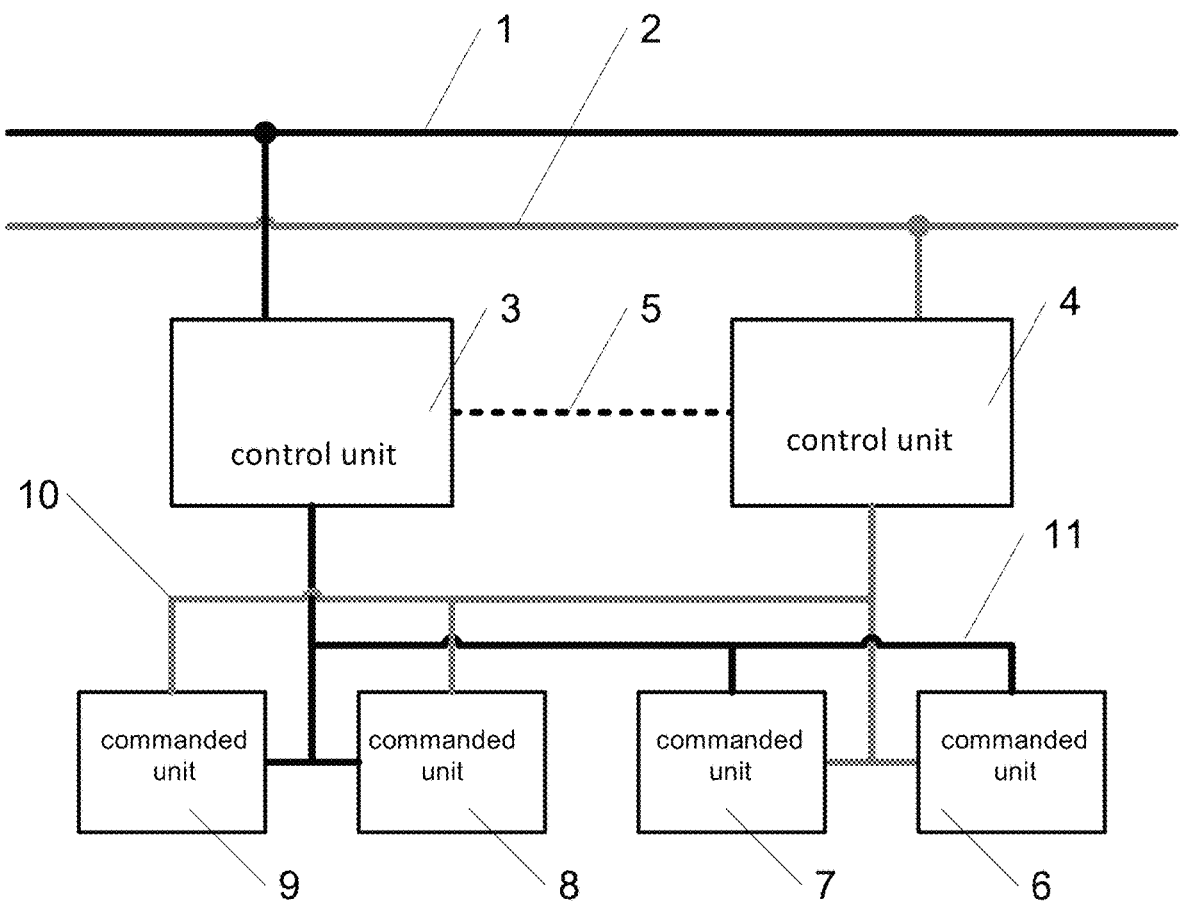
FIG. 1 illustrates an implementation of an apparatus according to embodiments with a vehicle architecture.

FIG. 1 illustrates a vehicle architecture in which the apparatus according to embodiments of the present invention is implemented. The vehicle architecture includes a first vehicle communication network 1, a second vehicle communication network 2, a first control unit 3, a second control unit 4 and exemplary four commanded units 6, 7, 8, 9. The first control unit 3 couples to the first vehicle communication network 1 and is connected to all four commanded units 6, 7, 8, 9 by a first communication line 11. The second control unit 4 couples to the second vehicle communication network 2 and is likewise connected to all four commanded units 6, 7, 8, 9 by a second communication line 10. The first control unit 3 and the second control unit 4 are connected by an interlink communication line 5 to exchange information or data.

According to further embodiments, at least some or all or additional commanded units can be connected to one or both of the control units 3, 4. Therefore, the depicted vehicle architecture enables a redundant vehicle architecture in that all components are doubled so that each of the commanded units 6, 7, 8 and 9 can be controlled by the first and second vehicle communication network 1, 2 as well as by the first and second control units 3, 4 without using a common component whose failure might represent a critical situation. For example, the first control unit 3 may be controlled by the first vehicle communication network 1. The second control unit 4 may be controlled by the second vehicle communication network 2. The plurality of commanded units 6, 7, ... are configured to receive commands/data from the first control unit 3 and/or from the second control unit 4 over dedicated communication lines 10, 11.

Although there are two control units 3, 4 described in the example, there could be more than two, with a first set of the control units being connected to the first vehicle communication network 1 with the rest (a second set) being connected to the second vehicle communication network 2. Interlink communication lines 10, 11 would then connect the first set of control units to the second set of control units.

The commanded units 6, 7, 8, 9 can be any unit as long as at least one of them allow a forwarding of data received by the first control unit 3 via the first communication line 11 and received from the second control unit 4 via the second communication line 10. Therefore, one or more of the commanded units 6, 7, 8, 9 can act as the gateway unit(s) to forward information from the first control unit 3 to the second control unit 4 or vice-versa. Hence, also the connection between the first and second control units 3, 4 is redundant, either via the interlink communication line 5 or via at least one commanded unit 6, 7, 8, 9 which is placed in a gateway mode to forward the data from one of the control units 3,4 to the other control unit 4, 3. It is understood that the selected gateway unit can nevertheless perform its dedicated function (e.g. an actuation or as an intelligent storage element) while gatewaying data.

The apparatus according to embodiments can be implemented by software in one or both control units 3, 4 which are configured to place at least one of the commanded units 6, 7, 8, 9 in the gateway modus to relay data received from one of the control units 3,4 to the other control unit 4, 3. Alternatively, it is also possible that the apparatus according to embodiments is implemented in one of the commanded units 6, 7, 8, 9 or in another control unit not depicted in FIG. 1, but which is able to control one of the commanded units 6, 7, 8, 9 to place it in the gateway modus.

It is also understood that it is sufficient that at least one of the commanded units 6, 7, 8, 9 is placed in the gateway modus to act as a gateway unit, although the invention should not be limited to this case. In particular, it is also possible that two, three or all of the commanded units 6, 7, 8, 9 are placed in the gateway modus. This provides multiple possibilities to forward information between both control units 3, 4.

According to an embodiment, the control architecture is configured to transmit data between the first vehicle communication network 1 and the second control unit 4 through utilisation of the interlink communication line 5 and/or the gateway unit. The control architecture is likewise configured also to transmit data between the second vehicle communication network 2 and the first control unit 3 through utilisation of the interlink communication line 5.

According to an embodiment, in a first mode of operation the first control unit 3 is configured to act as a master controller and the second control unit 4 is configured to act as a slave controller, and in a second mode of operation the second control unit 4 is configured to act as a master controller and the first control unit 3 is configured to act as a slave controller.

In an embodiment, there can be more than two control units, one of them acting as the master and the rest acting as slaves. Thus, if there were three control units, then using the above nomenclature there can be three modes of operation, where in each mode a different control unit acts as the master, with the rest acting as slaves. This then applies for four, five six control units, where there would be four, five and six modes of operation etc.

According to an embodiment, the determination of the mode of operation comprises a communication over the interlink communication line 5 and/or through the gateway unit.

According to an embodiment, the determination of the mode of operation is performed according to an algorithm and the control units 3, 4 are aligned over the interlink communication line 5 and/or through the gateway unit.

According to an embodiment, the determination of the mode of operation is performed by the first control unit 3 and/or the second control unit 4.

According to an embodiment, the first control unit 3 and the second control unit 4 are configured to utilise the interlink communication line 5 and/or the gateway unit to transmit data between the control units 3, 4 to perform a plausibility check and/or a crosscheck task. This enhance the security and avoids the situation that two contradicting control units are operating.

The determination of the master-slave role division is performed by the control units according to an appropriate algorithm and aligned through the interlink communication line. In this way, having the redundant communication lines (via line 5 and lines 10, 11 and a gateway unit) between the control units 3, 4 makes it possible to mitigate or avoid the situation where one of the vehicle communication networks 1, 2 is in failure or down. In such a case data from the intact vehicle communication network 1, 2 can be transmitted to the other control unit 3, 4 via the redundant communication lines.

Figure 2:
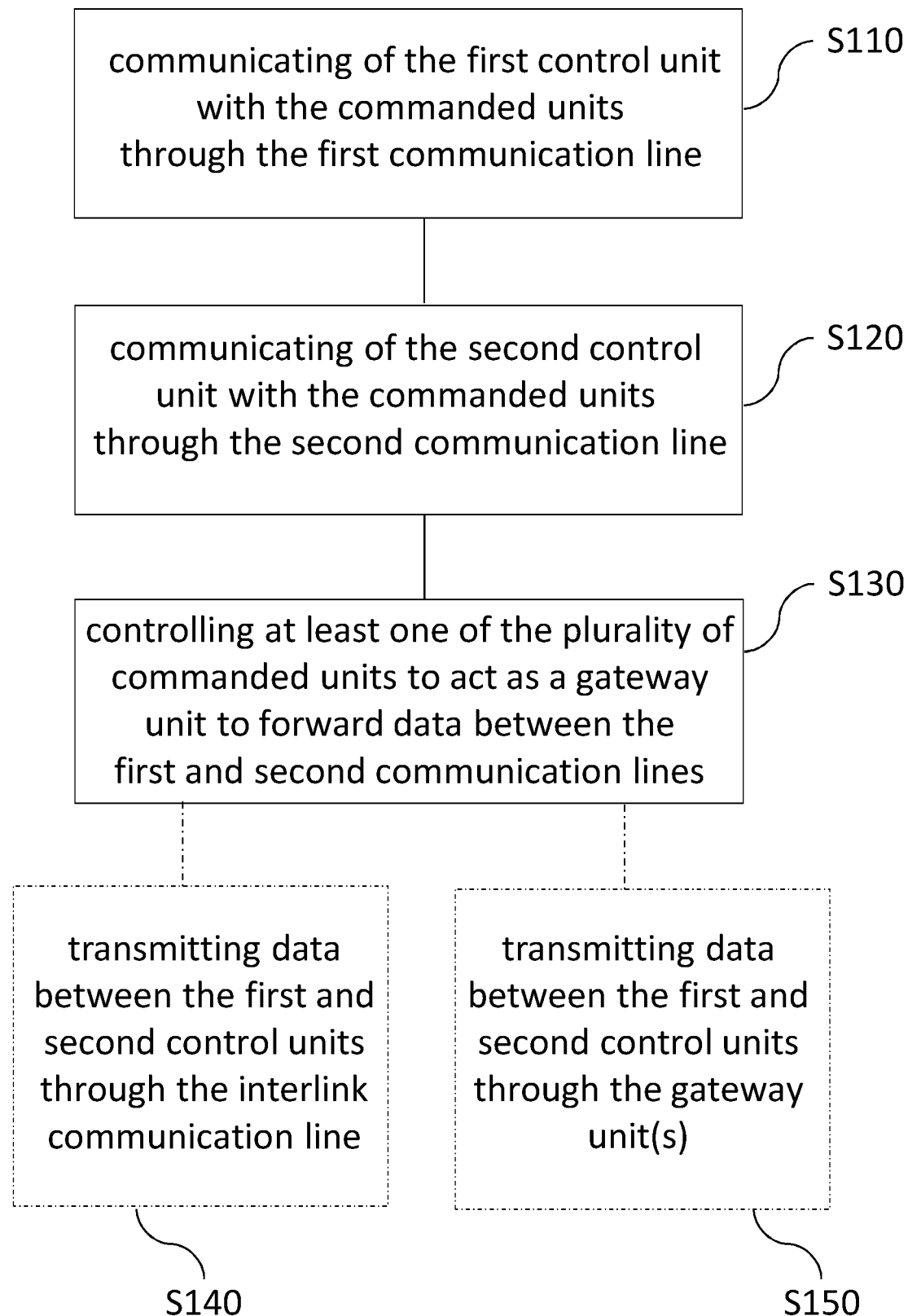
FIG. 2 shows a method for a control architecture of a vehicle according to another embodiment.

FIG. 2 depicts a flow diagram of a method for providing a redundant communication within a vehicle architecture. The vehicle architecture includes a plurality of commanded units 6, 7, 8, 9, each being configured to be controlled by a first and a second communication line 11, 10, at least a first and a second control unit 3, 4, and an interlink communication line 5 between the at least first and second control units 3, 4. The method includes:

communicating S110 of the first control unit 3 with the commanded units 6, 7, 8, 9 through the first communication line 11;

communicating S120 of the second control unit 4 with the commanded units 6, 7, 8, 9 through the second communication line 10; and controlling S130 at least one of the plurality of commanded units 6 to act as a gateway unit 6 to forward data between the first and second communication lines 10, 11.

Optionally, the method further includes the further step of establishing a redundant communication between the first and second control units 3, 4 by transmitting data S140 between the first and second control units 3, 4 through the interlink communication line 5; or transmitting data S150 between the first and second control units 3, 4 through the gateway unit 6.

It is further understood that each of the functions described in conjunction with the apparatus can be implemented as further optional method steps in the method for providing a redundant communication in a vehicle architecture.

This method may also be a computer-implemented method. A person of skill in the art would readily recognize that steps of various above-described methods may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

Further advantageous embodiments relate to the following:

A redundant vehicle architecture with at least two control units 3, 4, each of them connected to one of the redundant vehicle communication networks 1, 2 and an interlink communication line 5 between them and the control units are connected to any number of commanded units 6, 7, 8, 9 by control/communication lines 10, 11, wherein a redundant pair of the interlink communication line 5 is realized through the control lines 10, 11 by gatewaying the exchanged information through the commanded units (6-9).

In the redundant vehicle architecture, the exchanged information is gatewayed in each direction from the control unit 3 to the control unit 4 and vice versa.

In the redundant vehicle architecture, the control units can take either master or slave role. One of them has the master role, while the other(s) has slave role.

In the redundant vehicle architecture, the determination of master-slave role is performed by the controllers according to an appropriate algorithm and aligned through the interlink communication lines 5 and 10/11.

In the redundant vehicle architecture, the interlink communication lines 5 and 10/11 are used to transmit data from the redundant vehicle communication network gained by one of the control units 3, 4 to the other control unit(s) 3, 4.

In the redundant vehicle architecture, the interlink communication lines 5 and 10/11 is used to swap data between control units to perform plausibility checking and/or crosscheck tasks.

The description and drawings merely illustrate the principles of the disclosure. It will thus be appreciated that those skilled in the art will be able to devise various arrangements that, although not explicitly described or shown herein, embody the principles of the disclosure and are included within its scope.

In the claims, the word "comprising" or "including" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS

1, 2 communication network circuits
3, 4 control units (e.g. a first and a second control unit)
5 Interlink communication line
6, 7, 8, 9 commanded units (one or all activatable as a gateway)
10, 11 communication (or control) lines

The invention claimed is:

1. An apparatus for providing a redundant communication within a vehicle architecture, the vehicle architecture including a plurality of commanded units, each commanded unit being configured to be controlled by redundant communication lines, the apparatus comprising:
   at least a first control unit and a second control unit, which are connected by an interlink communication line and which are each configured to:
      communicate with the commanded units through one of the redundant communications lines; and
      communicate with each other via the interlink communication line and through the redundant communication lines by controlling at least one of the plurality of commanded units to act as a gateway unit to forward information from the first control unit to the second control unit or vice-versa via the redundant communication lines, wherein the at least one commanded unit that acts as the gateway is able to perform its dedicated functions even while acting as the gateway.

2. The apparatus according to claim 1, wherein the gateway unit is configured to forward information in each direction between the communication lines.

3. The apparatus according to claim 2, wherein the interlink communication line and/or the communication through the gateway is/are configured to swap data between the at least first and second control units to enable a plausibility check and/or a cross-check.

4. The apparatus according to claim 1, wherein each commanded unit of the plurality of commanded units is configured to act as a gateway to forward data between the redundant communication lines.

5. The apparatus according to claim 1, wherein the at least first and second control units are configured to act either as a master or as a slave.

6. The apparatus according to claim 5, wherein the at least first and second control units are configured to select one of them as a master and the other as a slave following a predetermined algorithm by exchanging information through the interlink communication line or through the communication lines.

7. The apparatus according to claim 1, wherein the vehicle architecture includes redundant vehicle communication networks,
   the interlink communication line and a redundant communication through the gateway unit are configured to transmit data received from one of the redundant vehicle communication networks, via the first and second control units, to the other of the redundant vehicle communication networks.

8. The apparatus according to claim 1, wherein the at least first and second control units are configured to control one or more of: a braking action, a steering action, a transmission, an energy management, or a battery charging; and
   the commanded units include one or more of: a brake actuator, a steering actuator, a transmission actuator, an intelligent energy storage element, a wheel end control unit, a modulator, or a valve.

9. The apparatus according to claim 1, wherein the plurality of commanded units are configured to be operable in a normal mode and a gateway mode, and the at least one of the plurality of commanded units is placed in the gateway mode to act as the gateway by the first control unit or the second control unit.

10. The apparatus according to claim 1, wherein only one of the plurality of commanded units is controlled to act as the gateway.

11. A vehicle architecture, comprising:
    a plurality of commanded units, each commanded unit being configured to be controlled by redundant communication lines;
    an apparatus for providing redundant communication within the vehicle architecture, the apparatus comprising:
    at least a first control unit and a second control unit, which are connected by an interlink communication line and which are each configured to:
       communicate with the commanded units through one of the redundant communications lines; and
       communicate with each other via the interlink communication line and through the redundant communication lines by controlling at least one of the plurality of commanded units to act as a gateway unit to forward information from the first control unit to the second control unit or vice-versa via the redundant communication lines, wherein the at least one commanded unit that acts as the gateway is able to perform its dedicated functions even while acting as the gateway.

12. The vehicle architecture according to claim 11, further comprising:
    redundant vehicle communication networks which are configured to provide data to either the first control unit or to the second control unit.

13. A method for providing a redundant communication within a vehicle architecture, the vehicle architecture including: a plurality of commanded units, each being configured to be controlled by a first and a second communication line; at least a first and a second control unit; and an interlink communication line between the at least first and second control units, the method comprising:
    communicating of the first control unit with the commanded units through the first communication line;
    communicating of the second control unit with the commanded units through the second communication line;
    controlling, by the first control unit or by the second control unit, at least one of the plurality of commanded units to act as a gateway unit to forward data from the first control unit to the second control unit or vice-versa via the first and second communication lines, wherein the at least one commanded unit that acts as the gateway is able to perform its dedicated functions even while acting as the gateway.

14. The method according to claim 13, further comprising:
    establishing a redundant communication between the first and second control units by:
    (i) transmitting data between the first and second control units through the interlink communication line; or
    (ii) transmitting data between the first and second control units through the gateway unit.

15. A computer product comprising a non-transitory computer-readable medium having stored thereon program code which, when executed on one or more processors, in a vehicle architecture including: a plurality of commanded units, each being configured to be controlled by a first and a second communication line; at least a first and a second control unit; and an interlink communication line between the at least first and second control units, carries out the acts of:
    communicating of the first control unit with the commanded units through the first communication line;

communicating of the second control unit with the commanded units through the second communication line;

controlling, by the first control unit or by the second control unit, at least one of the plurality of commanded units to act as a gateway unit to forward data from the first control unit to the second control unit or vice-versa via the first and second communication lines, wherein the at least one commanded unit that acts as the gateway is able to perform its dedicated functions even while acting as the gateway.

* * * * *